US011620586B2

(12) United States Patent
Stogo et al.

(10) Patent No.: US 11,620,586 B2
(45) Date of Patent: Apr. 4, 2023

(54) OFFLINE AUTHORIZATION OF AIRLINE TICKETING REQUESTS

(71) Applicant: UNITED AIRLINES, INC., Chicago, IL (US)

(72) Inventors: Robert Erik Stogo, Houston, TX (US); Namratha Prabhakara Rao Pavar, The Woodlands, TX (US)

(73) Assignee: UNITED AIRLINES, INC., Chicago, IL (US)

( * ) Notice: Subject to any disclaimer, the term of this patent is extended or adjusted under 35 U.S.C. 154(b) by 23 days.

(21) Appl. No.: 16/842,292

(22) Filed: Apr. 7, 2020

(65) Prior Publication Data

US 2021/0312339 A1   Oct. 7, 2021

(51) Int. Cl.
*G06Q 10/02*   (2012.01)
*G06Q 50/30*   (2012.01)
(Continued)

(52) U.S. Cl.
CPC ......... *G06Q 10/02* (2013.01); *G06F 16/2372* (2019.01); *G06Q 20/102* (2013.01); *G06Q 50/30* (2013.01)

(58) Field of Classification Search
CPC .... G06Q 20/16; G06Q 20/085; G06Q 20/102; G06Q 20/108; G06Q 20/204; G06Q 20/00
(Continued)

(56) References Cited

U.S. PATENT DOCUMENTS

2003/0164400 A1* 9/2003 Boyd ................... G06Q 20/045
                                                                235/382
2014/0101036 A1   4/2014 Phillips et al.
(Continued)

FOREIGN PATENT DOCUMENTS

WO   WO-2020132193 A1 *  6/2020 ............. G06Q 20/40

OTHER PUBLICATIONS

Gordon, Whitson; "In-flight Wi-Fi is terrible—here's how to make it better"; Sep. 1, 2018. (Year: 2018).*
(Continued)

*Primary Examiner* — Resha Desai
*Assistant Examiner* — Dione N. Simpson
(74) *Attorney, Agent, or Firm* — Marshall, Gerstein & Borun LLP

(57) ABSTRACT

A method and system may reduce latency and improve connectivity by performing offline authorization of products and services related to airline reservations. A server device may receive a request for a product or service related to an airline reservation from a user including payment information for the user and may transmit the payment information to a payment service provider for authorization. In response to identifying an outage at the payment service provider, the server device generates a temporary approval code indicative of a successful payment to prevent latency during the outage at the payment service provider and stores transaction data including a representation of the payment information for the user in an offline database. The server device proceeds as if payment was successful and provides an order confirmation message to the user's client device indicating that the product or service has been reserved for the user.

18 Claims, 7 Drawing Sheets

(51) Int. Cl.
  *G06Q 20/10*    (2012.01)
  *G06F 16/23*    (2019.01)
(58) Field of Classification Search
  USPC .............................................. 705/5
  See application file for complete search history.

(56) References Cited

U.S. PATENT DOCUMENTS

| | | | |
|---|---|---|---|
| 2015/0066756 A1 | 3/2015 | Killian et al. | |
| 2016/0110718 A1* | 4/2016 | Jajara ................. | G06Q 20/4016 |
| | | | 705/44 |
| 2019/0279174 A1* | 9/2019 | Muthukrishnan ...... | G06Q 20/12 |
| 2020/0258135 A1* | 8/2020 | Sternlight .......... | G06Q 30/0611 |
| 2020/0380508 A1* | 12/2020 | Sheriff ................. | G06Q 20/322 |

OTHER PUBLICATIONS

Dominik; "Confirmed Reservation vs Ticketed Reservation"; Feb. 12, 2016. (Year: 2016).*

* cited by examiner

OFFLINE AUTHORIZATION OF AIRLINE TICKETING REQUESTS

TECHNICAL FIELD

The present disclosure generally relates to offline authorization of products and services related to airline reservations and, more particularly to reducing latency and improving connectivity when processing airline transactions.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Today, many airline passengers attempt to purchase products or services related to airline reservations, such as airline tickets, seat assignments, etc., with credit or debit cards. To process these transactions, an airline server may communicate with a payment service provider which determines whether a credit or debit card transaction is authorized or declined. However, when the payment service provider experiences an outage, customers' transactions may not be completed and the customers may be unable to purchase airline tickets, pay fees, etc., during this time period. In some scenarios, this may result in flights being delayed until fees are processed. These outages can result in significant loss for the airline due to customers purchasing airline tickets elsewhere or from fees which may need to be waived to prevent flight delays.

BRIEF SUMMARY

To process an airline transaction offline when the payment service provider is experiencing an outage, a server computer may generate a temporary approval code for the transaction indicative of a successful payment to prevent latency during the outage. The server computer may then store the transaction including a representation of the payment information for the transaction, such as the payment information itself (e.g., a cardholder name, a credit card number, an expiration date, a security code, a card type (e.g., MasterCard®), etc.) or a token corresponding to the payment information in an offline database. The transaction may also include a name and contact information for the customer involved in the transaction, the cost of the transaction, the product or service purchased in the transaction, an airline reservation indicator corresponding to the product or service purchased for the transaction, etc. Additionally, the server computer may store the temporary approval code for the transaction in a payment database.

In response to generating the temporary approval code, the server computer may confirm the customer's request to purchase a product or service related to an airline reservation (e.g., an airline ticket). The server computer may generate an airline reservation indicator corresponding to the product or service (e.g., a passenger name record (PNR)), and provide an order confirmation message to a client device of the customer indicating that the payment was successful and including the airline reservation indicator. In this manner, customers can continue to purchase airline products and services when the payment service provider is experiencing an outage and do not need to wait for the payment service provider to return to normal operation before they can complete their purchases. Accordingly, the offline transactions system reduces latency in processing transactions and increases connectivity such that, from the customers' perspective, the system always appears to be operating properly without downtime.

Then when the payment service provider returns to normal operation or after a predetermined threshold amount of time, the server computer may retrieve the transaction from the offline database and retransmit the payment information to the payment service provider. If the payment service provider determines that the transaction is authorized, the payment service provider generates a new approval code and provides the new approval code to the server computer which removes the transaction from the offline database, removes the temporary approval code from the payment database, and stores the new approval code in the payment database. In this manner, the server computer may settle the transaction with the corresponding bank using the new approval code.

In an embodiment, a method for reducing latency and improving connectivity when processing airline transactions is provided. The method includes receiving a request for a product or service related to an airline reservation from a user including payment information for the user, transmitting a transaction including the payment information to a payment service provider for authorization, and identifying an outage at the payment service provider. In response to identifying the outage at the payment service provider, the method includes generating a temporary approval code indicative of a successful payment to prevent latency during the outage at the payment service provider, storing transaction data for the transaction including a representation of the payment information for the user in an offline database, and storing an airline reservation indicator for the user indicating that the product or service has been reserved for the user. The method further includes providing an order confirmation message to a client device of the user including the airline reservation indicator and indicating that the product or service has been reserved for the user, and retransmitting the payment information from the offline database to the payment service provider after a threshold time period or in response to receiving an indication that a connection to the payment service provider has been restored.

In another embodiment, a system for reducing latency and improving connectivity when processing airline transactions is provided. The system includes a communication network, one or more processors coupled to the communication network, and a non-transitory computer readable memory coupled to the communication network and the one or more processors. The memory includes computer-executable instructions stored thereon. When executed by the one or more processors, the instructions cause the one or more processors to receive, via the communication network, a request for a product or service related to an airline reservation from a user including payment information for the user, transmit a transaction including the payment information to a payment service provider for authorization, and identify an outage at the payment service provider. In response to identifying the outage at the payment service provider, the instructions cause the one or more processors to generate a temporary approval code indicative of a successful payment to prevent latency during an outage at the payment service provider, store transaction data for the transaction including a representation of the payment information for the user in an offline database, and generate and store an airline reservation indicator for the user indicating that the product or service has been reserved for the user. Furthermore, the instructions cause the one or more processors to provide, via the communication network, an order confirmation message to a client device of the user including the airline reservation indicator and indicating that the product or service has been reserved for the user, and retransmit the payment information from the offline database to the payment service provider after a threshold time period or in response to receiving an indication that a connection to the payment service provider has been restored.

In yet another embodiment, a non-transitory computer readable memory includes computer-executable instructions stored thereon. When executed by the one or more processors, the instructions cause the one or more processors to receive, via the communication network, a request for a product or service related to an airline reservation from a user including payment information for the user, transmit a transaction including the payment information to a payment service provider for authorization, and identify an outage at the payment service provider. In response to identifying the outage at the payment service provider, the instructions cause the one or more processors to generate a temporary approval code indicative of a successful payment to prevent latency during an outage at the payment service provider, store transaction data for the transaction including a representation of the payment information for the user in an offline database, and generate and store an airline reservation indicator for the user indicating that the product or service has been reserved for the user. Furthermore, the instructions cause the one or more processors to provide, via the communication network, an order confirmation message to a client device of the user including the airline reservation indicator and indicating that the product or service has been reserved for the user, and retransmit the payment information from the offline database to the payment service provider after a threshold time period or in response to receiving an indication that a connection to the payment service provider has been restored.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Although the following text sets forth a detailed description of numerous different embodiments, it should be understood that the legal scope of the description is defined by the words of the claims set forth at the end of this patent and equivalents. The detailed description is to be construed as providing examples only and does not describe every possible embodiment since describing every possible embodiment would be impractical. Numerous alternative embodiments could be implemented, using either current technology or technology developed after the filing date of this patent, which would still fall within the scope of the claims.

Generally speaking, techniques for processing offline transactions may be implemented in one or more network servers, one or more client devices, a payment service provider, or a system that includes a combination of these devices. However, for example purposes, the examples below focus primarily on an embodiment in which a client device transmits a request for a product or service related to an airline reservation, such as an airline ticket to a server device. The request may include payment information for the product or service. The server device may generate an airline reservation indicator corresponding to the product or service (e.g., a PNR) in response to the request. The server device then provides the payment information to a payment service provider. If the server device does not receive a response message after a threshold amount of time, the connection between the server device and the payment service provider is unavailable, or the server device receives an indication of a connection failure from the payment service provider 142, such as an error message from the payment service provider indicating that the payment service provider is experiencing an outage, the server device identifies an outage at the payment service provider.

In response to identifying the outage at the payment service provider, the server device generates a temporary approval code for the transaction and stores the transaction in an offline database. The stored transaction may include payment information for the product or service, a name and contact information for the customer involved in the transaction, the cost of the transaction, the product or service purchased in the transaction, an airline reservation indicator corresponding to the product or service purchased for the transaction, etc. Then the server device proceeds as if the transaction was successful by providing an order confirmation message to the client device confirming that the product or service has been reserved for the user. The order confirmation message may also include the airline reservation indicator.

Figure 1:
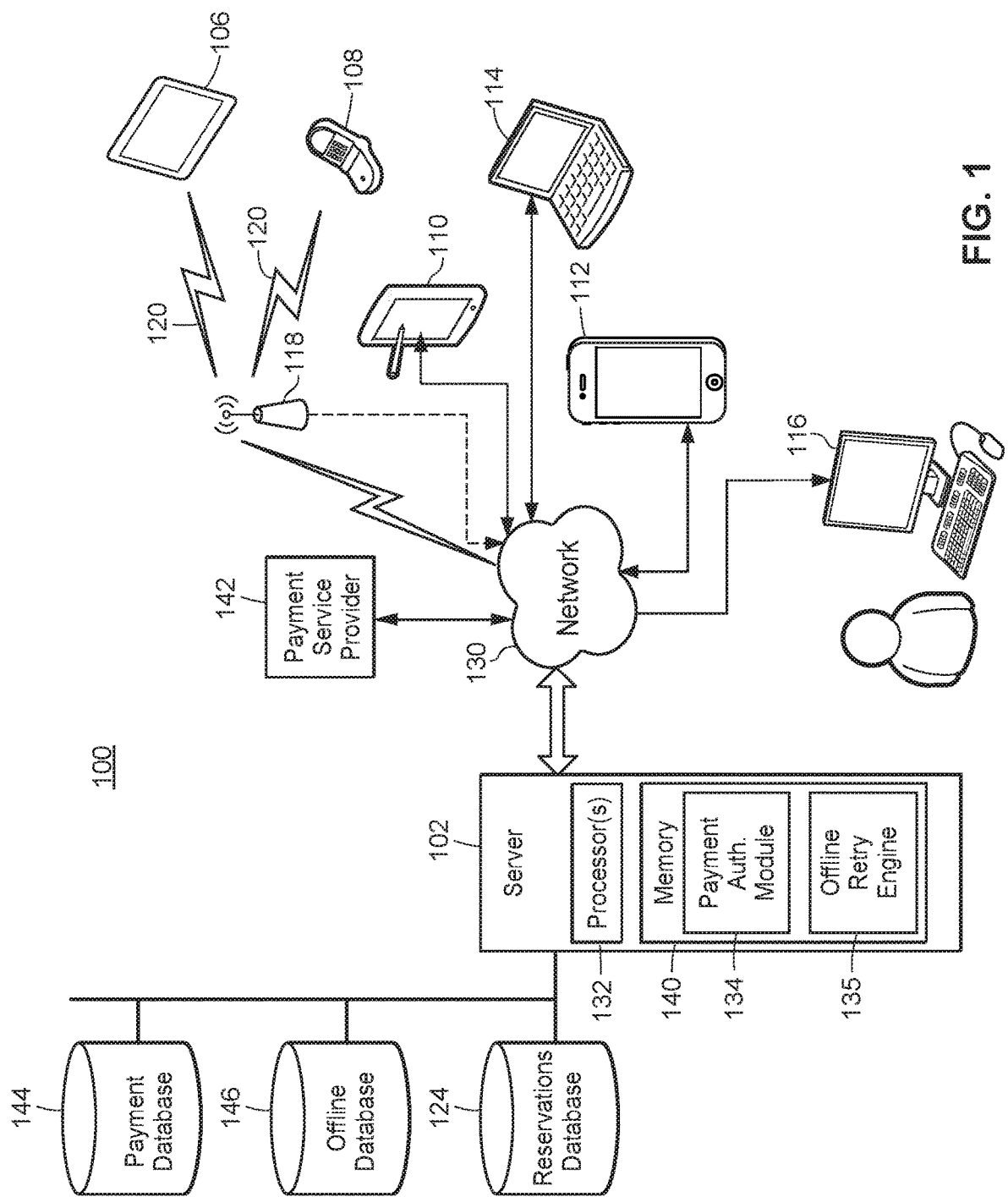
FIG. 1 illustrates a block diagram of a computer network and system on which an offline transactions system may operate in accordance with an example aspect of the present disclosure.

FIG. 1 illustrates various aspects of an example environment implementing an offline transactions system 100. The environment 100 may include a server device 102, a payment service provider 142, and/or a plurality of client devices 106-116 which may be communicatively connected through a network 130, as described below. According to embodiments, the server device 102 may be a combination of hardware and software components, also as described in more detail below. The server device 102 may have an associated airline reservations database 124 for storing flight information related to the operation of the offline transactions system 100 such as passenger reservations for departing flights including reserved seat assignments, passenger priority information, etc. (e.g., an airline computer reservation system such as SHARES, Amadeus, Travelport, SABRE, etc.). The server device 102 may also have an associated payment database 144 that stores transaction data indicative of transactions processed by the payment service provider 142 which may include approval codes. The approval codes may then be used to settle the transactions with the corresponding banks, for example at the end of each day. Furthermore, the server device 102 may have an associated offline database 146 that stores transaction data for payments that were not processed by the payment service provider 142 due to an outage at the payment service provider 142. The transaction data for each payment may include payment information (e.g., a credit or debit card number, a credit or debit card expiration date, a credit or debit card security code, a card type (e.g., MasterCard®), a cardholder name, etc.) or a token corresponding to the payment information which may be used to process the payment information at a later time (e.g., when the payment service provider 142 returns to normal operation). Moreover, the server device 102 may include a memory 140, one or more processors 132 such as a microcontroller or a microprocessor, a random-access memory, and/or an input/output (I/O) circuit, all of which may be interconnected via an address/data bus.

The memory 140 and/or the RAM may store various applications for execution by the one or more processors 132. For example, a user interface application may provide a user interface to the server device 102, which user interface may, for example, allow the system administrator to configure, troubleshoot, and/or test various aspects of the server's operation. A server application may operate to transmit payment information for products or services related to airline reservations to a payment service provider 142 for authorization, and initiate an offline transactions process when there is an outage at the payment service provider. The server application may be a single module or a plurality of modules.

The memory 140 may be tangible, non-transitory memory and may include any types of suitable memory modules, including random access memory (RAM), read-only memory (ROM), flash memory, other types of persistent memory, etc. The memory 140 may store, for example instructions executable on the processors 132 for a payment authorization module 134 and an offline retry engine 135.

To process payments for products or services related to airline reservations (e.g., airline tickets, seat assignments, fees, etc.), a payment authorization module 134 may receive a request for a product or service related to an airline reservation from a client device 106-116 of a customer, where the request includes payment information for the product or service. The payment authorization module 134 may then forward the payment information to the payment service provider 142. If the payment service provider 142 processes the payment information and authorizes the transaction, the payment authorization module 134 may receive a response message from the payment service provider 142 indicating that the transaction has been authorized and including an approval code. The payment authorization module 134 may then store the approval code in association with the corresponding transaction in the payment database 144. The payment authorization module 134 may also generate and/or transmit an airline reservation indicator corresponding to the product or service (e.g., a PNR), and provide an order confirmation message to the client device 106-116 of the customer indicating that the payment was successful and including the airline reservation indicator. If the payment service provider 142 processes the payment information and declines the transaction, the payment authorization module 134 may transmit a request to the client device 106-116 of the customer for another method of payment.

In other scenarios, the payment authorization module 134 may identify an outage at the payment service provider 142, for example when the payment authorization module 134 does not receive a response message after a threshold amount of time, the connection between the payment authorization module 134 and the payment service provider 142 is unavailable, or the payment authorization module 134 receives an indication of a connection failure from the payment service provider 142, such as an error message from the payment service provider 142 indicating that the payment service provider 142 is experiencing an outage. When the payment authorization module 134 identifies an outage at the payment service provider 142, the payment authorization module 134 may generate a temporary approval code (e.g., "99999") for the transaction and store the temporary approval code in the payment database 144. The temporary approval code may be the same for all transactions that occur during an outage at the payment service provider 142. The payment authorization module 134 may also store transaction data for the transaction including the payment information in the offline database 146. The transaction data may include payment information for the product or service, a name and contact information for the customer involved in the transaction, the cost of the transaction, the product or service purchased in the transaction, an airline reservation indicator corresponding to the product or service purchased for the transaction, etc. In some embodiments, the transaction data may include a token corresponding to the payment information rather than the payment information.

Then the payment authorization module 134 may generate and/or transmit an airline reservation indicator corresponding to the product or service (e.g., a PNR), and provide an order confirmation message to the client device 106-116 of the customer indicating that the payment was successful and including the airline reservation indicator. This procedure is described in more detail with reference to FIG. 2.

Then when the payment service provider 142 returns to normal operation or after a predetermined threshold amount of time, the offline retry engine 135 may retrieve the payment information for the transaction from the offline database 146. Then the offline retry engine 135 may retransmit the payment information to the payment service provider 142. If the payment service provider 142 processes the payment information and authorizes the transaction, the offline retry engine 135 may receive a response message from the payment service provider 142 indicating that the transaction has been authorized and including an approval code. The offline retry engine 135 may then remove the transaction from the offline database 146 and replace the temporary approval code with the new approval code for the transaction in the payment database 144. If the payment service provider 142 processes the payment information and declines the transaction, the offline retry engine 135 may remove the transaction from the offline database 146 and the temporary approval code from the payment database 144, and transmit a request to the client device 106-116 of the customer for another method of payment. On the other hand, if the outage at the payment service provider 142 has not ended, the offline retry engine 135 may increase a transaction failure counter and retransmit the payment information once again when the offline retry engine 135 determines that the payment service provider 142 returns to normal operation or after another predetermined threshold amount of time. If the transaction failure counter exceeds a threshold number indicating that the offline retry engine 135 has unsuccessfully attempted to transmit the payment information to the payment service provider 142 more than a threshold number of times, the offline retry engine 135 may stop transmitting the payment information to the payment service provider 142 until further notice. This procedure is described in more detail with reference to FIGS. 3-5.

The client devices 106-116 may include, by way of example, a tablet computer 106, a cell phone 108, a personal digital assistant (PDA) 110, a mobile device smart-phone 112 also referred to herein as a "mobile device," a laptop computer 114, a desktop computer 116, a portable media player, an airline kiosk, a home phone, a wearable computing device, smart glasses, smart watches, phablets, other smart devices, devices configured for wired or wireless RF (Radio Frequency) communication, etc. Of course, any network-enabled device appropriately configured may interact with the offline transactions system 100. The client devices 106-116 need not necessarily communicate with the network 130 via a wired connection. In some instances, the client devices 106-116 may communicate with the network 130 via wireless signals 120 and, in some instances, may communicate with the network 130 via an intervening wireless or wired device 118, which may be a wireless router, a wireless repeater, a base transceiver station of a mobile telephony provider, etc.

The client devices 106-116 may include a display, a communication unit, a user-input device, a memory, one or more processors such as a microcontroller or a microprocessor, a random-access memory (RAM), and/or an input/output (I/O) circuit, all of which may be interconnected via an address/data bus. The memory may include an operating system, a data storage, a plurality of software applications, and/or a plurality of software routines. The operating system, for example, may include one of a plurality of mobile platforms such as the iOS®, Android™, Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage may include data such as user profiles, application data for the plurality of applications, routine data for the plurality of routines, and/or other data necessary to interact with the server device 102 through the digital network 130. In some embodiments, the one or more processors may also include, or otherwise be communicatively connected to, other data storage mechanisms (e.g., one or more hard disk drives, optical storage drives, solid state storage devices, etc.) that reside within the client device 106-116.

The communication unit may communicate with the server device 102 via any suitable wireless communication protocol network, such as a wireless telephony network (e.g., GSM, CDMA, LTE, etc.), a Wi-Fi network (802.11 standards), a WiMAX network, a Bluetooth network, etc.

The user-input device may include a "soft" keyboard that is displayed on the display of the client device 106-116, an external hardware keyboard communicating via a wired or a wireless connection (e.g., a Bluetooth keyboard), an external mouse, or any other suitable user-input device.

The one or more processors may be adapted and configured to execute any one or more of the plurality of software applications and/or any one or more of the plurality of software routines residing in the memory, in addition to other software applications. One of the plurality of applications may be a client application that may be implemented as a series of machine-readable instructions for performing the various tasks associated with receiving information at, displaying information on, and/or transmitting information from the client device 106-116.

One of the plurality of applications may be a native application and/or web browser, such as Apple's Safari®, Google Chrome™, Microsoft Internet Explorer®, and Mozilla Firefox® that may be implemented as a series of machine-readable instructions for receiving, interpreting, and/or displaying web page information from the server device 102 while also receiving inputs from the user. Another application of the plurality of applications may include an embedded web browser that may be implemented as a series of machine-readable instructions for receiving, interpreting, and/or displaying web page information from the server device 102. One of the plurality of routines may include an airline reservation routine which presents flight information on the user interface, receives requests for products or services related to airline reservations, and transmits the requests including payment information for the products or services to the server device 102. Another routine in the plurality of routines may include an order confirmation routine that presents an order confirmation message on the user interface including an airline reservation indicator corresponding to the product or service (e.g., a PNR).

Preferably, a user may launch an airline application from a client device, such as one of the client devices 106-116 to purchase products or services related to airline reservations by communicating with the server device 102 to implement the offline transactions system 100. Additionally, the user may also launch or instantiate any other suitable user interface application (e.g., the native application or web browser, or any other one of the plurality of software applications) to access the server device 102 to purchase products or services related to airline reservations to realize the offline transactions system 100. Generally, while the term "user" in many instances may be used interchangeably with the term "customer," in this specification, the term "user" is used when referring to a person who is operating a client device and is not exclusive of the term "customer." For example, customers operating client devices may be referred to as users.

Each of the client devices 106-116 may interact with the server device 102 to receive web pages and/or server data and may display the web pages and/or server data via a client application and/or an Internet browser. For example, the mobile device 112 may display a web page to a user, may receive an input from the user, and/or may interact with the server device 102 depending on the type of user-specified input. Based upon the client interactions with the server device 102, the server device 102 may generate and transmit an order confirmation message to a customer, may transmit an indication that the payment has been declined and request an alternative method of payment, etc.

It will be appreciated that although only one server device 102 is depicted in FIG. 1, multiple servers 102 may be provided for the purpose of distributing server load, serving different web pages, etc. These multiple servers 102 may include a web server, an entity-specific server (e.g. an Apple® server, etc.), a server that is disposed in a retail or proprietary network, a payment service server, a payment broker server, a payment handler server, etc. The multiple servers 102 may also include an airline reservations server, such as SHARES, Amadeus, Travelport, SABRE, etc., which may store data for departing flights such as passenger reservations including reserved seat assignments, passenger priority information, etc.

The server device 102 may communicate with the client devices 106-116 via the network 130. The digital network 130 may be a proprietary network, a secure public Internet, a virtual private network and/or some other type of network, such as dedicated access lines, plain ordinary telephone lines, satellite links, a wireless telephony network, combinations of these, etc. Where the digital network 130 comprises the Internet, data communication may take place over the digital network 130 via an Internet communication protocol.

Figure 2:
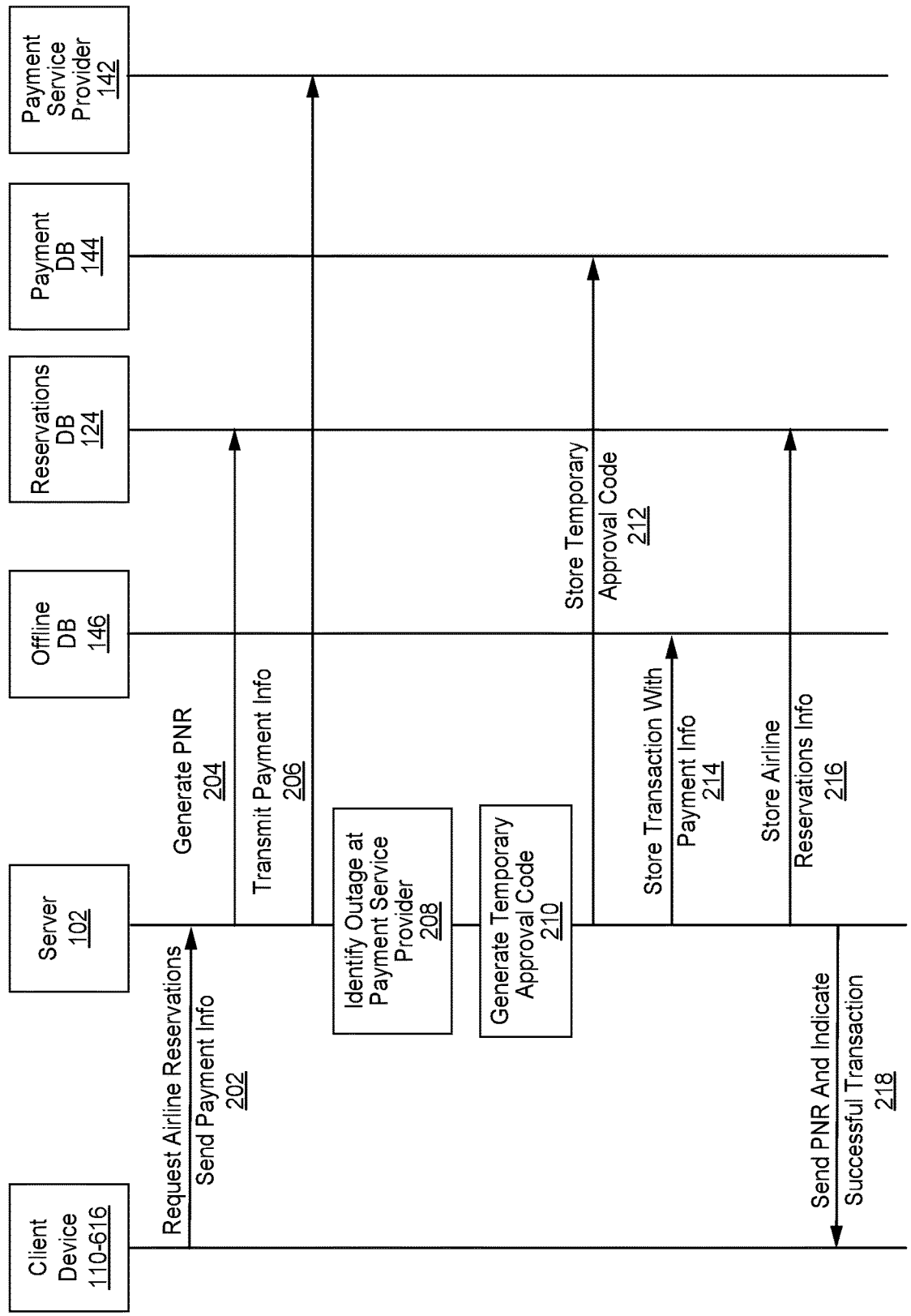
FIG. 2 illustrates a messaging diagram of an example procedure for processing an offline transaction when a payment service provider is experiencing an outage.

As discussed above, when a customer requests a product or service related to an airline reservation, for example via an airline website or airline application executing on a client device 106-116, the client device 106-116 transmits the request to a server device 102. The server device 102 then transmits payment information for the product or service related to the airline reservation to a payment service provider 142. FIG. 2 depicts a messaging diagram of an example procedure for processing an offline transaction when a payment service provider 142 is experiencing an outage. The client device 106-116 transmits 202 a request for a product or service related to an airline reservation to the server device 102, such as an airline ticket for a departing flight, a seat assignment on the departing flight, an upgrade to a different travel class on the departing flight, fees for the departing flight, etc. The request may include payment information for the product or service, such as a credit or debit card number, a credit or debit card expiration date, a credit or debit card security code, a card type (e.g., MasterCard®), a cardholder name, etc. In other embodiments, the server device 102 may store payment information for the customer or a token corresponding to the payment information, and the request may include an instruction to use the stored payment information.

The server device 102 may then communicate with an airline reservations database 124, such as SHARES, Amadeus, Travelport, SABRE, etc., to generate 204 an airline reservation indicator (e.g., a PNR) for the user indicating that the product or service has been reserved for the user. The airline reservation indicator may be stored in the airline reservations database 124. Additionally, when the product or service related to the reservation is a seat assignment for example, the server device 102 and/or the airline reservations database 124 may not generate a new airline reservation indicator, but instead may update the information associated with a previously generated airline reservation indicator for the departing flight in which the seat assignment is selected. This may also be the case when the product or service related to the reservation is fees. The server device 102 may then store the updated information (e.g., fees have been paid for two bags for PNR 12345 corresponding to flight 1111 from Los Angeles to Denver on Dec. 7, 2019 at 4 p.m., seat 28C has been selected for PNR 12345 corresponding to flight 1111, etc.) in the airline reservations database 124.

In other embodiments, the server device 102 may not communicate with the airline reservations database 124 to generate 204 an airline reservation indicator until the payment authorization module 134 in the server device 102 receives an indication of a successful payment from the payment service provider 142 or obtains an approval code from the payment database 144. In yet other embodiments, the server device 102 communicates with the airline reservations database 124 to generate the airline reservation indicator, but does not store 216 the airline reservation indicator or the updated information in the airline reservations database 124 and/or does not transmit the airline reservation indicator or the updated information to the client device 106-116 until the payment authorization module 134 in the server device 102 receives an indication of a successful payment from the payment service provider 142 or obtains an approval code from the payment database 144.

In any event, the payment authorization module 134 transmits 206 payment information for the product or service related to the airline reservation to a payment service provider 142. In response to transmitting the payment information, the payment authorization module 134 may identify 208 an outage at the payment service provider 142. The payment authorization module 134 may identify the outage if the payment authorization module 134 does not receive a response message from the payment service provider 142 after a threshold amount of time, the connection between the payment authorization module 134 and the payment service provider 142 is unavailable, or the payment authorization module 134 receives an indication of a connection failure from the payment service provider 142, such as an error message indicating that the payment service provider 142 is experiencing an outage.

In response to identifying an outage at the payment service provider 142, the payment authorization module 134 generates 210 a temporary approval code for the transaction. The temporary approval code may be a string of alphanumeric characters (e.g., "99999") and may be the same for each transaction in which the payment service provider 142 experienced an outage. The payment authorization module 134 may then store 212 the temporary approval code in association with transaction data for the transaction in the payment database 144. The transaction data for the transaction may include the product or service purchased in the transaction, the cost of the transaction, an airline reservation indicator corresponding to the product or service purchased for the transaction, etc.

The payment authorization module 134 may also store 214 the payment information for the product or service in the offline database 146 along with additional transaction data for the transaction such as the name and contact information for the customer involved in the transaction, the cost of the transaction, the product or service purchased in the transaction, an airline reservation indicator corresponding to the product or service purchased for the transaction, etc. In other embodiments, the payment authorization module 134 does not store the payment information for the product or service in the offline database 146, and instead stores a token corresponding to the payment information. For example, the payment authorization module 134 may transmit the payment information to a third-party token server which may generate and/or transmit the token to the payment authorization module 134. The token may be a string of randomly generated alphanumeric or numeric characters that represent the payment information. The third-party token server may store the token with the payment information that the token represents. When the server device 102 once again attempts to communicate with the payment service provider 142, the offline retry engine 135 in the server device 102 may transmit the token to the third party token server which may, in turn, transmit the payment information corresponding to the token to the offline retry engine 135. Then the offline retry engine 135 may retransmit the payment information to the payment service provider 142.

Then the payment authorization module 134 transmits 218 an order confirmation message to the client device 106-116 indicating that the payment was successful and that the product or service has been reserved for the user. The order confirmation message may also include the airline reservation indicator.

Figure 3:
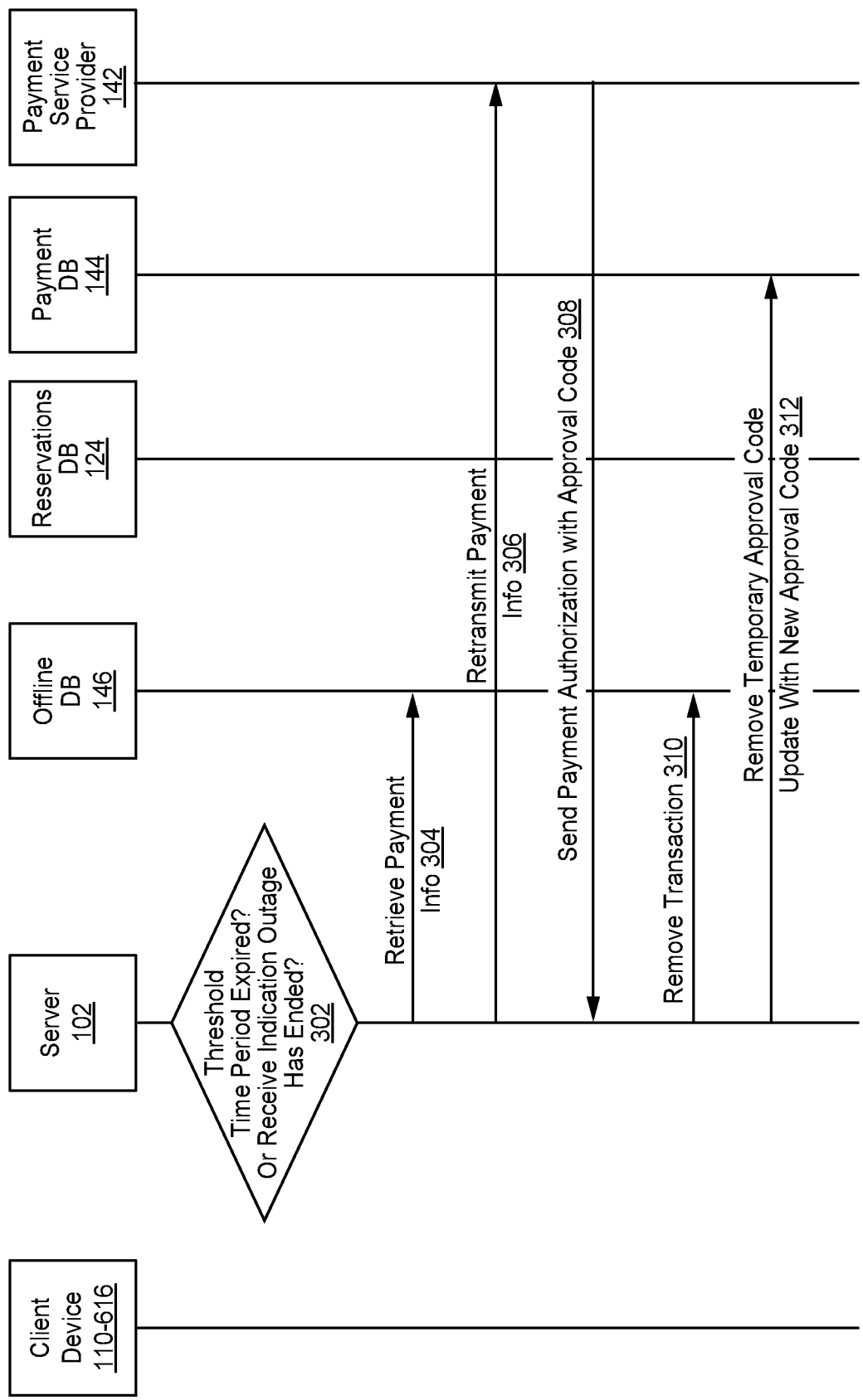
FIG. 3 illustrates a messaging diagram of an example procedure for retransmitting a transaction to the payment service provider once connection to the payment service provider is restored or after a predetermined threshold time period, where the retransmitted transaction is authorized.
Figure 4:
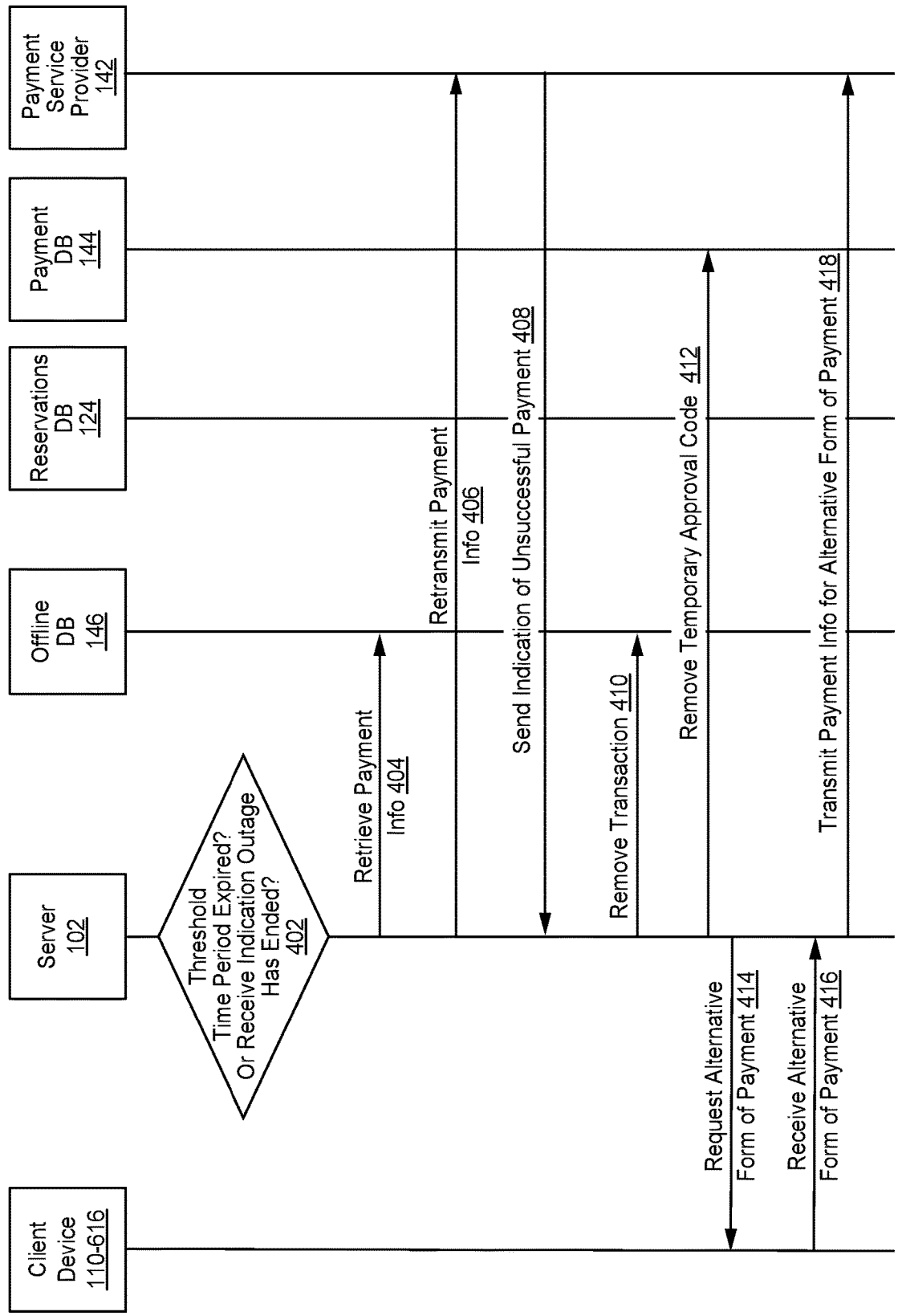
FIG. 4 illustrates a messaging diagram of an example procedure for retransmitting a transaction to the payment service provider once connection to the payment service provider is restored or after a predetermined threshold time period, where the retransmitted transaction is declined.
Figure 5:
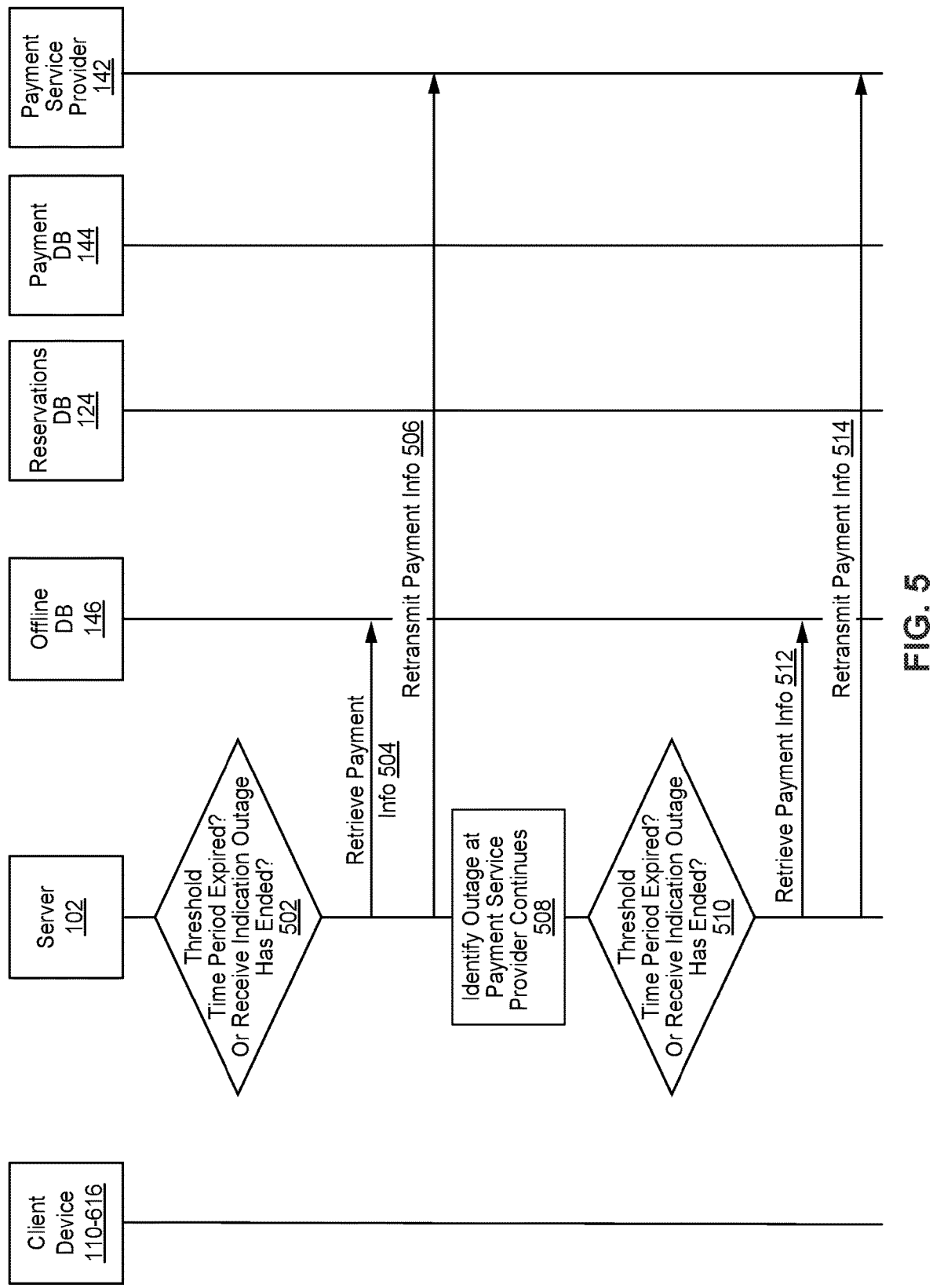
FIG. 5 illustrates a messaging diagram of an example procedure for retransmitting a transaction to the payment service provider after a predetermined threshold time period, where the outage continues.

After there is an outage at the payment service provider 142 and transactions are stored in the offline database 146, the server device 102 and more specifically, the offline retry engine 135 periodically (e.g., every 30 minutes) retrieves the transactions from a queue of transactions in the offline database 146 and retransmits the payment information to the payment service provider 142. In other embodiments, the offline retry engine 135 retrieves the transactions from a queue of transactions in the offline database 146 in response to determining that the payment service provider 142 has returned to normal operation. In some embodiments, the offline retry engine 135 periodically retransmits the payment information for the queue of transactions in the offline database 146 to the payment service provider 142 while the payment authorization module 134 transmits payment information for new transactions to the payment service provider 142. FIGS. 3-5 illustrate messaging diagrams of example procedures for retransmitting the payment information for a transaction to the payment service provider 142, where the payment is authorized, declined, or the outage at the payment service provider 142 has not ended.

More specifically, FIG. 3 illustrates a messaging diagram of an example procedure for retransmitting a transaction to the payment service provider 142 once connection to the payment service provider is restored or after a predetermined threshold time period, where the retransmitted transaction is authorized. The offline retry engine 135 in the server device 102 determines 302 whether a threshold time period has expired (e.g., 30 minutes after the last attempt to communicate with the payment service provider 142) or whether the offline retry engine 135 has received an indication that the connection to the payment service provider 142 has been restored. For example, the offline retry engine 135 may determine that the connection to the payment service provider 142 has been restored upon transmitting payment information for a subsequent transaction to the payment service provider 142 and receiving a response message from the payment service provider 142 (e.g., indicating that the payment is authorized or declined).

In an example scenario, a first user may transmit a first request for a product or service related to an airline reservation to the server device 102 which includes payment information for the product or service. The payment authorization module 134 in the server device 102 may transmit the payment information for the first request to the payment service provider 142 and may determine that the payment service provider 142 is experiencing an outage. Accordingly, the payment authorization module 134 may generate a temporary approval code and store transaction data for the transaction in the offline database 146. Subsequently, a second user may transmit a second request for a product or service related to an airline reservation to the server device 102 which includes payment information for the product or service. The payment authorization module 134 in the server device 102 may transmit the payment information for the second request to the payment service provider 142. The payment service provider 142 may then transmit a response message indicative of a successful payment for the second request to the payment authorization module 134, which may include a valid approval code. As a result, the offline retry engine 135 may determine that the connection to the payment service provider 142 has been restored.

In some embodiments, the offline retry engine 135 determines whether a transaction failure counter exceeds a threshold number indicating that the offline retry engine 135 has unsuccessfully attempted to transmit the payment information to the payment service provider 142 more than a threshold number of times. If the transaction failure counter exceeds the threshold number, the offline retry engine 135 may stop transmitting the payment information to the payment service provider 142 until further notice. For example, the offline retry engine 135 may stop transmitting the payment information until receiving a selection of a user control at the server device 102 (e.g., from a system administrator) instructing the offline retry engine 135 to resume the process.

In response to determining that the threshold time period has expired or that the connection to the payment service provider 142 has been restored, the offline retry engine 135 may retrieve 304 payment information for a transaction from the offline database 146. In some embodiments, the offline retry engine 135 retrieves payment information for each of the transactions in a queue of transactions in the offline database 146. In any event, the offline retry engine 135 retransmits 306 the payment information for the transaction to the payment service provider 142, which authorizes the payment and transmits 308 a payment authorization including a valid approval code to the offline retry engine 135.

The offline retry engine 135 then removes 310 the transaction from the offline database 146, and replaces 312 the temporary approval code which is stored in association with the transaction in the payment database 144 with the new approval code. In this manner, the valid approval code is used rather than the temporary approval code when the transaction is settled with the corresponding bank, for example at the end of the day.

FIG. 4 illustrates a messaging diagram of an example procedure for retransmitting a transaction to the payment service provider 142 once connection to the payment service provider 142 is restored or after a predetermined threshold time period, where the retransmitted transaction is declined. As in the messaging diagram of FIG. 3, the offline retry engine 135 in the server device 102 determines 402 whether a threshold time period has expired or whether the offline retry engine 135 has received an indication that the connection to the payment service provider 142 has been restored.

In some embodiments, the offline retry engine 135 determines whether a transaction failure counter exceeds a threshold number indicating that the offline retry engine 135 has unsuccessfully attempted to transmit the payment information to the payment service provider 142 more than a threshold number of times. If the transaction failure counter exceeds the threshold number, the offline retry engine 135 may stop transmitting the payment information to the payment service provider 142 until further notice. For example, the offline retry engine 135 may stop transmitting the payment information until receiving a selection of a user control at the server device 102 (e.g., from a system administrator) instructing the offline retry engine 135 to resume the process.

In response to determining that the threshold time period has expired or that the connection to the payment service provider 142 has been restored, the offline retry engine 135 may retrieve 404 payment information for a transaction from the offline database 146. In some embodiments, the offline retry engine 135 retrieves payment information for each of the transactions in a queue of transactions in the offline database 146. In any event, the offline retry engine 135 retransmits 406 the payment information for the transaction to the payment service provider 142, which declines the payment and transmits 408 an indication that the payment has been declined to the offline retry engine 135.

The offline retry engine 135 then removes 410 the transaction from the offline database 146, and removes 412 the temporary approval code which is stored in association with the transaction from the payment database 144. The offline retry engine 135 transmits 414 a message to the client device 106-116 indicating that the transaction has been declined and requesting an alternative method of payment. The user may then provide an alternative method of payment via the client device 106-116 which is sent 416 to the offline retry engine 135. Accordingly, the offline retry engine 135 transmits 418 the payment information for the alternative method of payment to the payment service provider 142, which may authorize the payment and transmit a payment authorization including a valid approval code to the offline retry engine 135. The offline retry engine 135 may then store the valid approval code in association with the transaction in the payment database 144.

FIG. 5 illustrates a messaging diagram of an example procedure for retransmitting a transaction to the payment service provider 142 after a predetermined threshold time period, where the outage continues. As in the messaging diagrams in FIGS. 4 and 5, the offline retry engine determines 502 whether a threshold time period has expired or whether the offline retry engine 135 has received an indication that the connection to the payment service provider 142 has been restored.

In some embodiments, the offline retry engine 135 determines whether a transaction failure counter exceeds a threshold number indicating that the offline retry engine 135 has unsuccessfully attempted to transmit the payment information to the payment service provider 142 more than a threshold number of times. If the transaction failure counter exceeds the threshold number, the offline retry engine 135 may stop transmitting the payment information to the payment service provider 142 until further notice. For example, the offline retry engine 135 may stop transmitting the payment information until receiving a selection of a user control at the server device 102 (e.g., from a system administrator) instructing the offline retry engine 135 to resume the process.

In response to determining that the threshold time period has expired or that the connection to the payment service provider 142 has been restored, the offline retry engine 135 may retrieve 504 payment information for a transaction from the offline database 146. In some embodiments, the offline retry engine 135 retrieves payment information for each of the transactions in a queue of transactions in the offline database 146. In any event, the offline retry engine 135 retransmits 506 the payment information for the transaction to the payment service provider 142. The offline retry engine 135 may then identify 508 that the outage at the payment service provider 142 has not ended. For example, the offline retry engine 135 may not receive a response message after a threshold amount of time, the connection between the server device 102 and the payment service provider 142 may remain unavailable, or the offline retry engine 135 may receive an error message from the payment service provider 142 indicating that the payment service provider 142 is experiencing an outage.

In any event, the offline retry engine 135 may then increase the transaction failure counter. If the transaction failure counter exceeds a threshold number indicating that the offline retry engine 135 has unsuccessfully attempted to transmit the payment information to the payment service provider 142 more than a threshold number of times, the offline retry engine 135 may stop transmitting the payment information to the payment service provider 142 until further notice. Otherwise, the offline retry engine 135 may determine 510 whether another threshold time period has expired or whether the offline retry engine 135 has received an indication that the connection to the payment service provider 142 has been restored. In response to determining that the other threshold time period has expired or that the connection to the payment service provider 142 has been restored, the offline retry engine 135 may once again retrieve 512 payment information for the transaction from the offline database 146, and retransmit 514 the payment information for the transaction to the payment service provider 142.

Figure 6:
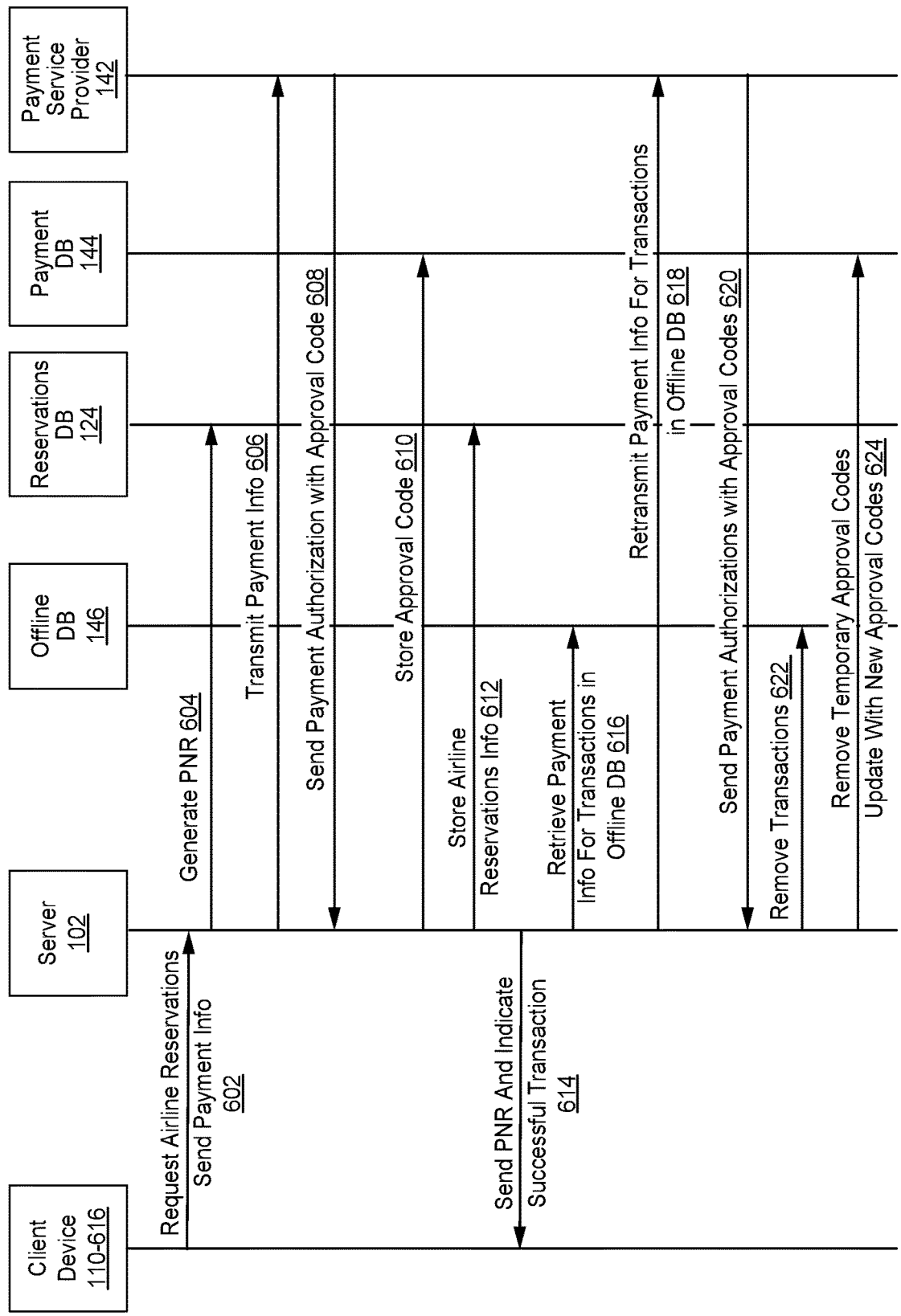
FIG. 6 illustrates a messaging diagram of an example procedure for processing an online transaction when connection to the payment service provider is restored and for retransmitting offline transactions which were stored in an offline database while the payment service provider experienced an outage.

In some scenarios, the offline retry engine 135 may retransmit the payment information for transactions in a queue of transactions in the offline database 146 in response to receiving an indication that connection to the payment service provider 142 has been restored. One way to determine that connection to the payment service provider 142 has been restored may be to receive a response message from the payment service provider 142 when transmitting payment information for a subsequent transaction. FIG. 6 illustrates a messaging diagram of an example procedure for processing an online transaction when connection to the payment service provider 142 is restored and for retransmitting offline transactions which were stored in the offline database 146 while the payment service provider 142 experienced an outage.

The client device 106-116 transmits 602 a request for a product or service related to an airline reservation to the server device 102, such as an airline ticket for a departing flight, a seat assignment on the departing flight, an upgrade to a different travel class on the departing flight, fees for the departing flight, etc. The request may include payment information for the product or service, such as a credit or debit card number, a credit or debit card expiration date, a credit or debit card security code, a card type (e.g., Master-Card®), a cardholder name, etc. In other embodiments, the server device 102 may store payment information for the customer or a token corresponding to the payment information, and the request may include an instruction to use the stored payment information. The request may be transmitted after an outage occurred at the payment service provider 142 and one or several transactions were stored in a queue of transactions in the offline database 146.

The server device 102 may then communicate with an airline reservations database 124, such as SHARES, Amadeus, Travelport, SABRE, etc., to generate 604 an airline reservation indicator (e.g., a PNR) for the user indicating that the product or service has been reserved for the user. In other embodiments, the server device 102 may not communicate with the airline reservations database 124 to generate 604 an airline reservation indicator until the payment authorization module 134 in the server device 102 receives an indication of a successful payment from the payment service provider 142 or obtains an approval code from the payment database 144. In yet other embodiments, the server device 102 communicates with the airline reservations database 124 to generate the airline reservation indicator, but does not store 612 the airline reservation indicator or updated information in the airline reservations database 124 and/or does not transmit the airline reservation indicator or the updated information to the client device 106-116 until the payment authorization module 134 in the server device 102 receives an indication of a successful payment from the payment service provider 142 or obtains an approval code from the payment database 144.

In any event, the payment authorization module 134 transmits 606 payment information for the product or service related to the airline reservation to the payment service provider 142, which authorizes the payment and transmits 608 a payment authorization including a valid approval code to the server device 102. The server device then stores 610 the valid approval code in association with the transaction in the payment database 144, and transmits 614 an order confirmation message to the client device 106-116 indicating that the payment was successful and that the product or service has been reserved for the user. The order confirmation message may also include the airline reservation indicator.

The server device 102 may then determine that the connection to the payment service provider 142 has been restored since the server device 102 received a response message from the payment service provider 142 in response to transmitting the payment information for the transaction. Accordingly, the server device, and more specifically, the offline retry engine 135, may retrieve 616 payment information for each of the transactions in a queue of transactions in the offline database 146. The offline retry engine 135 retransmits 618 the payment information for each of the transactions to the payment service provider 142, which authorizes the transactions and transmits 620 payment authorizations including valid approval codes to the offline retry engine 135.

The offline retry engine 135 then removes 622 the transactions from the offline database 146, and replaces 624 the temporary approval codes which are stored in association with the transactions in the payment database 144 with the new approval codes. In this manner, the valid approval codes are used rather than the temporary approval code when the transaction is settled with the corresponding bank, for example at the end of the day.

In some embodiments, the offline retry engine 135 periodically retrieves payment information for each of the transactions in the queue of transactions in the offline database 146 and retransmits the payment information to the payment service provider 142 while the payment authorization module 134 transmits payment information for new transactions to the payment service provider 142. In this manner, both online and offline transactions may be processed together, and the system can function normally without interruption when processing the offline transactions. In other words, the payment authorization module 134 does not need to stop transmitting new transactions to the payment service provider 142 when the offline retry engine 135 transmits offline transactions to the payment service provider 142.

Figure 7:
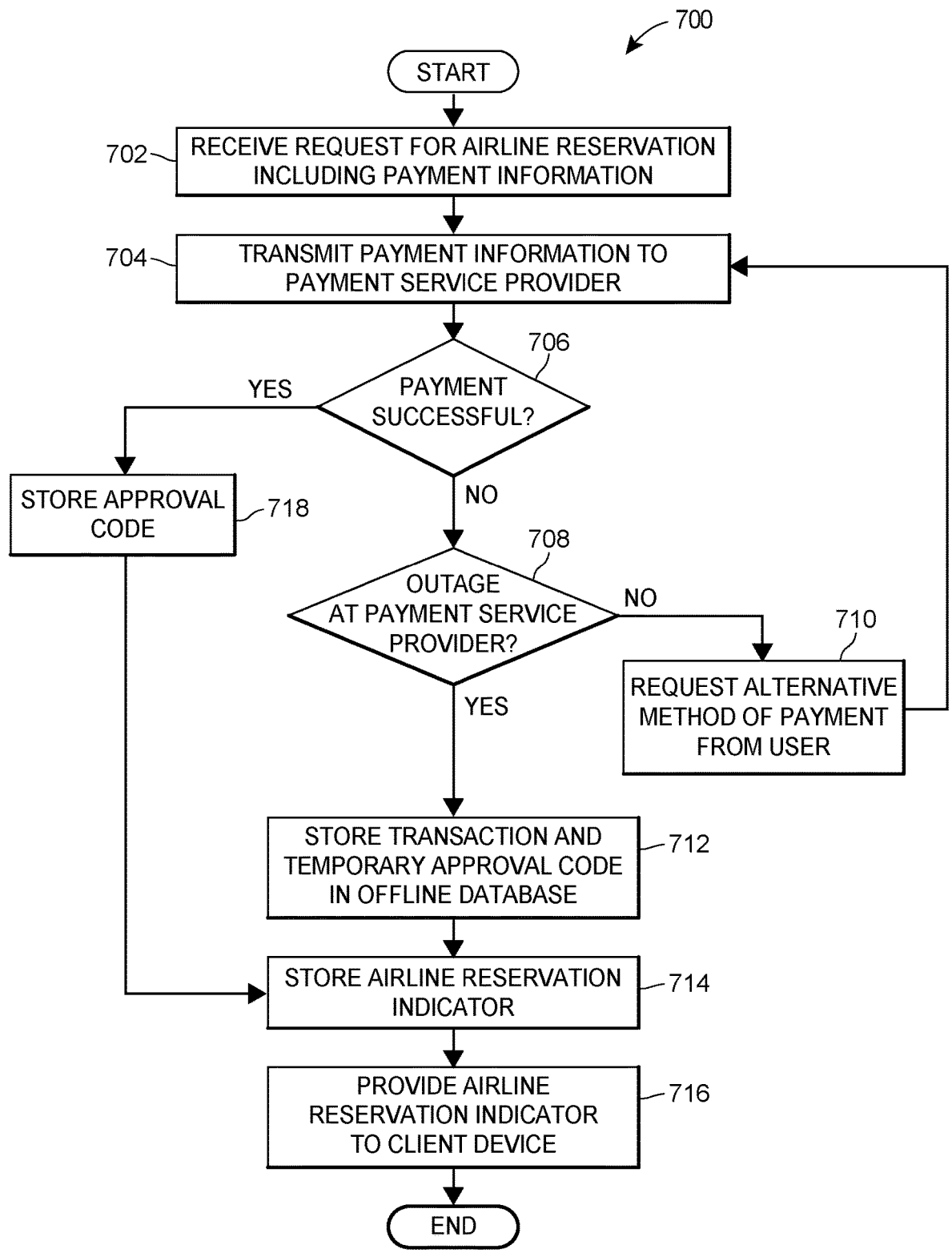
FIG. 7 depicts a flow diagram representing an example method for reducing latency and improving connectivity when processing airline transactions, which may be implemented by a server computer.

FIG. 7 illustrates a flow diagram representing an example method 700 for reducing latency and improving connectivity when processing airline transactions. The method may be executed on the server device 102. For example, at least a portion of the method 700 may be performed by the payment authorization module 134 which may be disposed within the server device 102. In an embodiment, the payment authorization module 134 may include computer-executable instructions stored on one or more non-transitory, tangible, computer-readable storage media or devices, and the computer-executable instructions of the payment authorization module 134 may be executed to perform the method 700.

At block 702, the server device 102 may receive a request for a product or service related to an airline reservation, for example via an airline website or airline application executing on a client device 106-116. The product or service may be an airline ticket for a departing flight, a seat assignment on the departing flight, an upgrade to a different travel class on the departing flight, fees for the departing flight, etc. The request may include payment information for the product or service, such as a credit or debit card number, a credit or debit card expiration date, a credit or debit card security code, a card type (e.g., MasterCard®), a cardholder name, etc. In other embodiments, the server device 102 may store payment information for the customer or a token corresponding to the payment information, and the request may include an instruction to use the stored payment information. Then at block 704, the server device 102 transmits the payment information for the product or service related to the airline reservation to a payment service provider 142.

If the payment service provider 142 authorizes the payment (block 706), the server device 102 may receive a payment authorization including a valid approval code, and may store the valid approval code in association with transaction data for the transaction in a payment database 144 (block 718). The transaction data for the transaction may include the product or service purchased in the transaction, the cost of the transaction, an airline reservation indicator corresponding to the product or service purchased for the transaction, etc.

The server device 102 may also communicate with an airline reservations database 124, such as SHARES, Amadeus, Travelport, SABRE, etc., to generate an airline reservation indicator (e.g., a PNR) for the user indicating that the product or service has been reserved for the user. The airline reservation indicator may be stored in the airline reservations database 124 (block 714). Additionally, when the product or service related to the reservation is a seat assignment for example, the server device 102 and/or the airline reservations database 124 may not generate a new airline reservation indicator, but instead may update the information associated with a previously generated airline reservation indicator for the departing flight in which the seat assignment is selected. This may also be the case when the product or service related to the reservation is fees. The server device 102 may then store the updated information (e.g., fees have been paid for two bags for PNR 12345 corresponding to flight 1111 from Los Angeles to Denver on Dec. 7, 2019 at 4 p.m., seat 28C has been selected for PNR 12345 corresponding to flight 1111, etc.) in the airline reservations database 124.

Then the server device 102 transmits an order confirmation message to the client device 106-116 indicating that the payment was successful and that the product or service has been reserved for the user (block 716). The order confirmation message may also include the airline reservation indicator.

If the transaction is not authorized (block 706) and the server device 102 does not identify an outage at the payment service provider 142 (block 708), the server device 102 may receive an indication from the payment service provider 142 that the transaction has been declined. If the transaction has been declined, the server device 102 transmits a message to the client device 106-116 indicating that the transaction has been declined and requesting an alternative method of payment (block 710). The user may then provide an alternative method of payment via the client device 106-116 which is sent to the server device 102. Accordingly, the server device 102 transmits the payment information for the alternative method of payment to the payment service provider 142 (block 704).

If the server device 102 identifies an outage at the payment service provider (block 708), the server device 102 generates a temporary approval code for the transaction. The temporary approval code may be a string of alphanumeric characters (e.g., "99999") and may be the same for each transaction in which the payment service provider 142 experienced an outage. The server device 102 may then store the temporary approval code in association with transaction data for the transaction in the payment database 144. The transaction data for the transaction may include the product or service purchased in the transaction, the cost of the transaction, an airline reservation indicator corresponding to the product or service purchased for the transaction, etc.

The server device 102 may also store the payment information for the product or service in the offline database 146 (block 712) along with additional transaction data for the transaction such as the name and contact information for the customer involved in the transaction, the cost of the transaction, the product or service purchased in the transaction, an airline reservation indicator corresponding to the product or service purchased for the transaction, etc. In other embodiments, the server device 102 does not store the payment information for the product or service in the offline database 146, and instead stores a token corresponding to the payment information. For example, the server device 102 may transmit the payment information a third-party token server which may generate and/or transmit the token to the server device 102. The token may be a string of randomly generated alphanumeric or numeric characters that represent the payment information. The third-party token server may store the token with the payment information that the token represents. When the server device 102 once again attempts to communicate with the payment service provider 142, the server device 102 may transmit the token to the third party token server which may, in turn, transmit the payment information corresponding to the token to the server device. Then the server device 102 may retransmit the payment information to the payment service provider 142.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as providing examples only and does not describe every possible embodiment, as describing every possible embodiment would be impractical, if not impossible. One could implement numerous alternate embodiments, using either current technology or technology developed after the filing date of this application.

We claim:

1. A method for reducing latency and improving connectivity when processing airline transactions, the method comprising:
   receiving, at one or more processors in a server device, a request for a product or service related to an airline reservation from a user including payment information for the user;
   transmitting, by the one or more processors, a transaction including the payment information to a payment service provider for authorization;
   identifying, by the one or more processors, an outage at the payment service provider;
   in response to identifying the outage at the payment service provider, generating, by the one or more processors, a temporary approval code indicative of a successful payment to prevent latency during the outage at the payment service provider;
   storing, by the one or more processors, transaction data for the transaction including a representation of the payment information for the user in an offline database;
   storing, by the one or more processors, a passenger name record (PNR) for the user indicating that the product or service has been reserved for the user, wherein the PNR is generated for the user in response to generating the temporary approval code;
   providing, by the one or more processors, an order confirmation message to a client device of the user including the PNR and indicating that the product or service has been reserved for the user; and
   after a threshold time period or in response to receiving an indication that a connection to the payment service provider has been restored, retransmitting the payment information from the offline database to the payment service provider.

2. The method of claim 1, further comprising:
   in response to retransmitting the payment information to the payment service provider and receiving an indication of a successful payment from the payment service provider:
   removing, by the one or more processors, the transaction data from the offline database; and
   updating, by the one or more processors, the temporary approval code for the transaction with a new approval code received from the payment service provider.

3. The method of claim 1, further comprising:
   in response to retransmitting the payment information to the payment service provider and identifying that the outage continues:
   retransmitting the payment information to the payment service provider a second time after the threshold time period.

4. The method of claim 1, further comprising:
in response to retransmitting the payment information to the payment service provider and receiving an indication of a failed payment from the payment service provider:
removing, by the one or more processors, the transaction data from the offline database;
storing, by the one or more processors, an indication that the transaction failed; and
requesting an alternative method of payment from the user.

5. The method of claim 1, wherein identifying an outage at the payment service provider includes at least one of:
receiving, by the one or more processors, an indication of a connection failure at the payment service provider; or
not receiving a response message from the payment service provider after a threshold time period.

6. The method of claim 1, further comprising:
storing, by the one or more processors, transaction data for a plurality of transactions for a plurality of users each associated with a temporary approval code in an offline database; and
periodically retransmitting, by the one or more processors, payment information for each of the plurality of transactions from the offline database to the payment service provider.

7. The method of claim 1, wherein payment information for each of the plurality of transactions is periodically retransmitted from the offline database to the payment service provider while additional transactions are transmitted to the payment service provider.

8. The method of claim 1, wherein after a threshold time period, retransmitting the payment information from the offline database to the payment service provider includes:
identifying that the outage at the payment service provider has ended; and
retransmitting the payment information from the offline database to the payment service provider in response to identifying that the outage at the payment service provider has ended.

9. The method of claim 8, wherein the request for a product or service related to an airline reservation is a first request from a first user and identifying that the outage at the payment service provider has ended includes:
receiving, by the one or more processors, a second request for a product or service related to an airline reservation from a second user including payment information for the second user after receiving the first request from the first user;
transmitting, by the one or more processors, the payment information for the second user to the payment service provider for authorization; and
receiving, by the one or more processors, a response message from the payment service provider indicative of a successful payment for the second user.

10. A server device for reducing latency and improving connectivity when processing airline transactions, the server device comprising:
a communication network;
one or more processors coupled to the communication network; and
a non-transitory computer readable memory coupled to the communication network and the one or more processors, including instructions stored thereon that, when executed by the one or more processors, cause the one or more processors to:

receive, via the communication network, a request for a product or service related to an airline reservation from a user including payment information for the user;
transmit a transaction including the payment information to a payment service provider for authorization;
identify an outage at the payment service provider;
in response to identifying the outage at the payment service provider, generate a temporary approval code indicative of a successful payment to prevent latency during an outage at the payment service provider;
store transaction data for the transaction including a representation of the payment information for the user in an offline database;
store a passenger name record (PNR) for the user indicating that the product or service has been reserved for the user, wherein the PNR is generated for the user in response to generating the temporary approval code;
provide, via the communication network, an order confirmation message to a client device of the user including the PNR and indicating that the product or service has been reserved for the user; and
after a threshold time period or in response to receiving an indication that a connection to the payment service provider has been restored, retransmit the payment information from the offline database to the payment service provider.

11. The server device of claim 10, wherein the instructions further cause the one or more processors to:
in response to retransmitting the payment information to the payment service provider and receiving an indication of a successful payment from the payment service provider:
remove the transaction data from the offline database; and
update the temporary approval code for the transaction with a new approval code received from the payment service provider.

12. The server device of claim 10, wherein the instructions further cause the one or more processors to:
in response to retransmitting the payment information to the payment service provider and identifying that the outage continues:
retransmit the payment information to the payment service provider a second time after the second threshold time period.

13. The server device of claim 10, wherein the instructions further cause the one or more processors to:
in response to retransmitting the payment information to the payment service provider and receiving an indication of a failed payment from the payment service provider:
remove the transaction data from the offline database;
store an indication that the transaction failed; and
request an alternative method of payment from the user.

14. The server device of claim 10, wherein to identify an outage at the payment service provider, the instructions cause the one or more processors to at least one of:
receive an indication of a connection failure at the payment service provider; or
not receive a response message from the payment service provider after a threshold time period.

15. The server device of claim 10, wherein the instructions further cause the one or more processors to:
store transaction data for a plurality of transactions for a plurality of users each associated with a temporary approval code in an offline database; and periodically retransmit payment information for each of the plurality of transactions from the offline database to the payment service provider.

16. The server device of claim 10, wherein payment information for each of the plurality of transactions is periodically retransmitted from the offline database to the payment service provider while additional transactions are transmitted to the payment service provider.

17. A non-transitory computer-readable memory including instructions stored thereon that, when executed by one or more processors in a server device, cause the one or more processors to:
- receive a request for a product or service related to an airline reservation from a user including payment information for the user;
- transmit a transaction including the payment information to a payment service provider for authorization;
- identify an outage at the payment service provider;
- in response to identifying the outage at the payment service provider, generate a temporary approval code indicative of a successful payment to prevent latency during an outage at the payment service provider;
- store transaction data for the transaction including a representation of the payment information for the user in an offline database;
- store a passenger name record for the user indicating that the product or service has been reserved for the user, wherein the PNR is generated for the user in response to generating the temporary approval code;
- provide an order confirmation message to a client device of the user including the PNR and indicating that the product or service has been reserved for the user; and
- after a threshold time period or in response to receiving an indication that a connection to the payment service provider has been restored, retransmit the payment information from the offline database to the payment service provider.

18. The non-transitory computer-readable memory of claim 17, wherein the instructions further cause the one or more processors to:
- in response to retransmitting the payment information to the payment service provider and receiving an indication of a successful payment from the payment service provider:
- remove the transaction data from the offline database; and
- update the temporary approval code for the transaction with a new approval code received from the payment service provider.

* * * * *